(12) United States Patent
Choi et al.

(10) Patent No.: US 9,400,920 B2
(45) Date of Patent: Jul. 26, 2016

(54) DISPLAY SCREEN CONTROLLING APPARATUS IN MOBILE TERMINAL AND METHOD THEREOF

(71) Applicant: CENTER FOR INTEGRATED SMART SENSORS FOUNDATION, Daejeon (KR)

(72) Inventors: Sang Gil Choi, Gyeonggi-do (KR); Chong Min Kyung, Daejeon (KR)

(73) Assignee: DUAL APERTURE INTERNATIONAL CO. LTD. (KR)

( * ) Notice: Subject to any disclaimer, the term of this patent is extended or adjusted under 35 U.S.C. 154(b) by 0 days.

(21) Appl. No.: 14/528,990

(22) Filed: Oct. 30, 2014

(65) Prior Publication Data

US 2015/0347821 A1 Dec. 3, 2015

(30) Foreign Application Priority Data

May 29, 2014 (KR) ........................ 10-2014-0064962

(51) Int. Cl.
| G09G 5/00 | (2006.01) |
| G06K 9/00 | (2006.01) |
| H04N 5/225 | (2006.01) |
| G06F 3/00 | (2006.01) |
| H04N 5/232 | (2006.01) |
| G06T 7/00 | (2006.01) |

(52) U.S. Cl.
CPC ............ *G06K 9/00221* (2013.01); *G06F 3/005* (2013.01); *G06K 9/00335* (2013.01); *G06T 7/0069* (2013.01); *H04N 5/2257* (2013.01); *H04N 5/23219* (2013.01); *G06T 2207/10024* (2013.01); *G06T 2207/10148* (2013.01); *G06T 2207/30201* (2013.01)

(58) Field of Classification Search
CPC .................. A01B 12/006; G06T 2207/10024; G06T 2207/10028; G06T 2207/30201
See application file for complete search history.

(56) References Cited

U.S. PATENT DOCUMENTS

| 2010/0007665 | A1* | 1/2010 | Smith ..................... G06T 13/40 245/473 |
| 2012/0233571 | A1* | 9/2012 | Wever ..................... G06F 3/048 715/835 |
| 2014/0184471 | A1* | 7/2014 | Martynov ............. G06F 3/1423 345/1.2 |
| 2015/0131879 | A1* | 5/2015 | Lu .......................... A61B 5/004 382/128 |

\* cited by examiner

*Primary Examiner* — Charles Hicks
(74) *Attorney, Agent, or Firm* — Schmeiser, Olsen & Watts, LLP

(57) ABSTRACT

A method for controlling a display screen of a mobile terminal includes acquiring a first image and a second image distinguished from the first image, using a cut-off filter provided in the camera attached to a front of the mobile terminal to cut off one of R (Red), G (Green) and B (Blue) signals, recognizing an object comprising a user's face or gesture based on the first image and second image, and controlling on/off of the display screen provided in the mobile terminal based on the result of the recognition.

14 Claims, 5 Drawing Sheets

DISPLAY SCREEN CONTROLLING APPARATUS IN MOBILE TERMINAL AND METHOD THEREOF

This application claims priority from and the benefit of Korean Patent Application No. 10-2014-0064962, filed on May 29, 2014, which is hereby incorporated by reference for all purposes as if fully set forth herein.

BACKGROUND OF THE DISCLOSURE

1. Field of the Disclosure

Exemplary embodiments of the disclosure relate to a controlling apparatus for automatically controlling ON/OFF of a display screen provided in a mobile terminal and a method thereof, more particularly, to technology for controlling ON/OFF of a display screen, using a camera mounted to a front surface of a mobile terminal.

2. Discussion of the Background

With recent generalization of a mobile terminal, an era of one terminal for one person has come. Such a mobile terminal has a display screen for displaying various tips of information and the mobile terminal senses a user's touch input, using a touch sensor provided in the display screen, to control diverse functions. At this time, personal information is stored in the mobile terminal and security strengthening is required such that a lock/unlock function implemented via a personal code number or pattern may be provided.

The mobile terminal has to switch on the display screen to perform such diverse functions. Especially, when the mobile terminal is locked, the display screen has to be on right after the mobile terminal is unlocked. In conventional technology of making a display screen on or lock releasing, a touch sensor or a physical sensor provided in a mobile terminal is used in receiving a user's input and an input window for a personal code or lock releasing pattern of the display screen is displayed in response to the received input, so as to induce the user to input a pattern or code number directly and to make the display screen on or release a locked state.

However, such conventional technology requires an additional process of receiving the user's input which can give inconvenience to the user. The pattern or personal code number might be exposed and security might be fragile disadvantageously.

Accordingly, the embodiments of the disclosure provide technology of controlling ON/OFF of a display screen, using a camera mounted to a front of a mobile terminal.

SUMMARY OF THE DISCLOSURE

Exemplary embodiments of the present disclosure provide a method and an apparatus for controlling ON/OFF of a display screen by recognizing a user's face or an object having a gesture, using a camera mounted to a front of a mobile terminal.

Especially, exemplary embodiments of the present disclosure provide a method and an apparatus for enhancing a recognition rate, using depth (a distance between an object and a mobile terminal) information as well as a 2D image when recognizing an object.

Exemplary embodiments of the present disclosure also provide a method and an apparatus for using depth by recognizing an object based on a first image and a second image which are acquired, using a cut-off filter for cutting off one of R (red), G (green) and B (blue) signals from a camera, when recognizing an object.

Exemplary embodiments of the present disclosure also provide a method and an apparatus for controlling lock/unlock of a display screen as well as controlling on/off of a display screen by recognizing an object, using a camera.

Exemplary embodiments of the present disclosure also provide a method for controlling a display screen of a mobile terminal includes acquiring a first image and a second image distinguished from the first image, using a cut-off filter provided in the camera attached to a front of the mobile terminal to cut off one of R (Red), G (Green) and B (Blue) signals; recognizing an object comprising a user's face or gesture based on the first image and second image; and controlling on/off of the display screen provided in the mobile terminal based on the result of the recognition.

The recognizing of the object may include calculating a distance between the object and the mobile terminal, using the first image and the second image; detecting the object from at least one of the first or second image and generating information on the object; and comparing the information on the object with information on a pre-stored reference object based on the calculated distance and recognizing the object.

The controlling of on/off of the display screen provided in the mobile terminal may include controlling the display screen to be on, when the information on the object is equal to the information on the pre-stored reference object based on the calculated distance.

The generating of the information on the object may include detecting the object from a RGB image generated by combination of the first and second images and generating the information on the object.

The acquiring of the first image and the second image may include acquiring the first image configured of the other signals except one cut-off signal out of the R, G and B signals, using the cut-off filter; and acquiring the second image configured of the cut-off signal in response to inlet of the cut off signal via a pin hole of the cut-off filter.

The acquiring of the first image and the second image may further include sensing change in motion of the mobile terminal to operate the camera, using a motion sensor.

The acquiring of the first image and the second image may further include sensing change in illuminance near the mobile terminal to operate the camera, using an illuminance sensor.

The e acquiring of the first image and the second image may further include sensing the user's touch input to operate the camera, using a touch sensor provided in the display screen.

The controlling of on/off of the display screen provided in the mobile terminal may further include implementing a function preset in the mobile terminal based on the result of the recognition.

Exemplary embodiments of the disclosure also provide a readable media readable by a computer in which a program for implementing the method of claim 1 is recorded.

Exemplary embodiments of the disclosure also provide an apparatus for controlling a display screen of a mobile terminal including a camera attached to a front of the mobile terminal to acquire a first image and a second image distinguished from the first image, using a cut-off filter for cutting off one out of R (Red), G (Green) and B (Blue) signals; a recognition unit for recognizing an object having one of a user's face and gesture based on the first image and the second image; and a controller for controlling on/off of the display screen provided in the mobile terminal based on the result of the recognition.

The recognition unit may include a distance calculation unit for calculating a distance between the object and the mobile terminal, using the first image and the second image;

and a detection unit for detecting the object from at least one of the first and second images to generate information on the object and comprising the generated information on the object with information on a preset reference object based on the calculated distance to recognize the object.

The controller may control the display screen to be on, when the information on the object is equal to the information on the preset reference object.

The detection unit may detect the object from a RGB image generated by combination of the first and second images and generates the information on the object.

The camera may acquire the first image configured of the other signals except the one cut-off signal out of the R, G and B signals, using the cut-off signal, and acquire the second image configured of the one cut-off signal in response to inlet of the cut off signal via a pin hole of the cut-off filter.

The apparatus for controlling the display screen of the mobile terminal may further include a motion sensor for sensing change in motion of the mobile terminal to operate the camera.

The apparatus for controlling the display screen of the mobile terminal may further include an illuminance sensor for sensing change in illuminance near the mobile terminal to operate the camera.

The display screen may include a touch sensor for sensing the user's touch input to operate the camera.

The controller may implement a function preset in the mobile terminal based on the result of the recognition performed by the recognition unit.

It is to be understood that both the foregoing general description and the following detailed description are exemplary and explanatory and are intended to provide further explanation of the disclosed subject matter as claimed.

Exemplary embodiments of the present disclosure provide a method and an apparatus for controlling ON/OFF of a display screen by recognizing a user's face or an object having a gesture, using a camera mounted to a front of a mobile terminal.

Especially, exemplary embodiments of the present disclosure provide a method and an apparatus for enhancing a recognition rate, using depth (a distance between an object and a mobile terminal) information as well as a 2D image when recognizing an object.

Exemplary embodiments of the present disclosure also provide a method and an apparatus for using depth by recognizing an object based on a first image and a second image which are acquired, using a cut-off filter for cutting off one of R (red), G (green) and B (blue) signals from a camera, when recognizing an object.

Exemplary embodiments of the present disclosure also provide a method and an apparatus for controlling lock/unlock of a display screen as well as controlling on/off of a display screen by recognizing an object, using a camera.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is FIG. 1 is a diagram illustrating a method for controlling a display screen of a mobile terminal according to exemplary embodiments of the disclosure.

Figure 1:
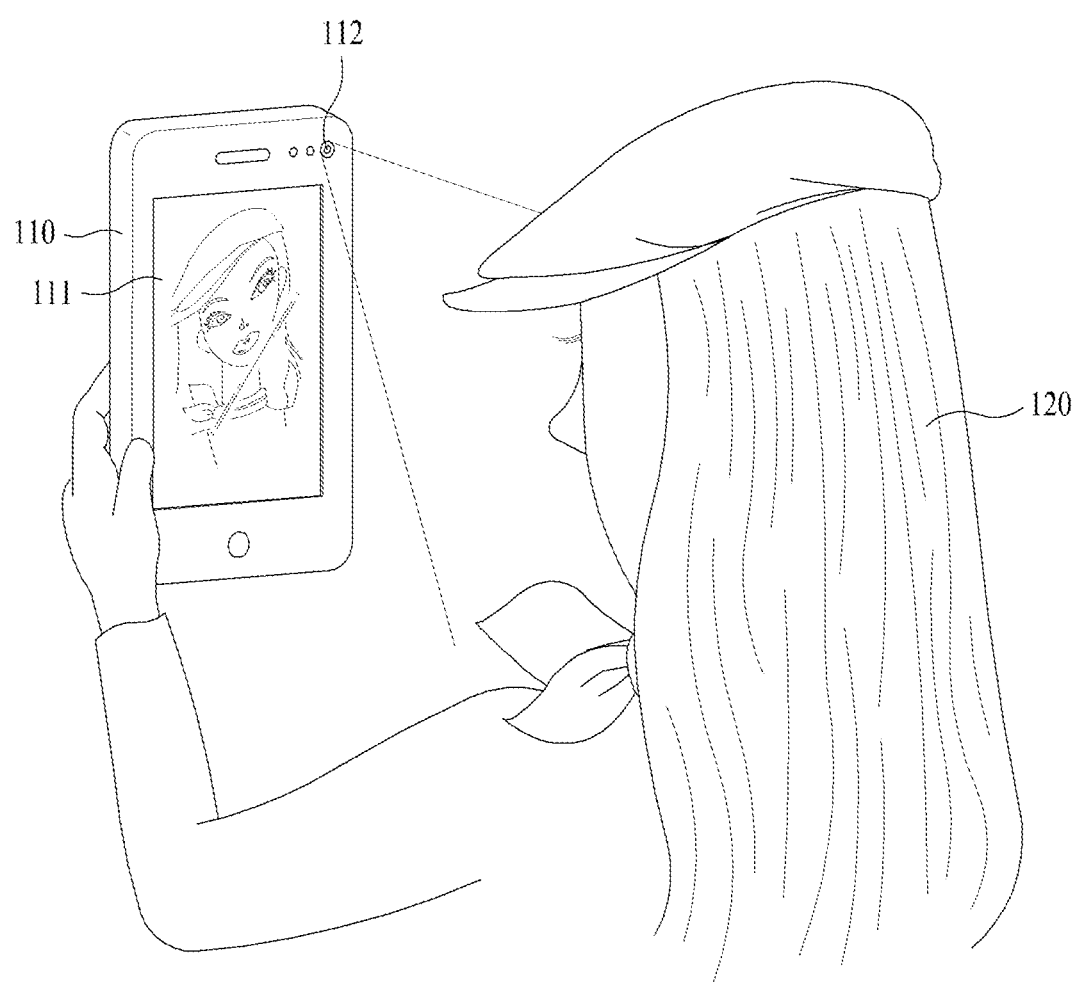
FIG. 1 is a diagram illustrating a method for controlling a display screen of a mobile terminal according to exemplary embodiments of the disclosure.

Referring to FIG. 1, an apparatus for controlling a display screen according to this embodiment of the disclosure is mounted in a mobile terminal 110 and the apparatus acquires an image for an object such as a user 120's face, using a camera 112 attached to a front of the mobile terminal 110. The apparatus for controlling the display screen recognizes an object, using the acquired image, only to control on/off of a display screen 111. In the drawing, an object is the user's face and the embodiments of the disclosure are not limited thereto. The object may be the use's gesture. For example, the object may be the user's 120 hand.

Specifically, the apparatus for controlling the display screen (hereinafter, the display screen controlling apparatus) detects an object from the image acquired by the camera 112 and generates information about the object. The apparatus compares the generated information with pre-stored information on a reference object, to recognize the object, such that on/off of the display screen 111 can be controlled. At this time, the display screen controlling apparatus can acquire an image configured of RGB signals from the camera 112 and use color information of an object, only to enhance a recognition rate for the object. For instance, when the user 120 sets a hand gesture configured of a V-shape made by a forefinger and a middle finger as a reference gesture for controlling on/off of the display screen 111, the display screen controlling apparatus acquires an image for the user's hand gesture from the acquired image and generates information on the user's hand gesture from the acquired image. Hence, the display screen controlling apparatus generates information on the user's hand gesture from the acquired image and compares the information with the preset reference gesture of the V-shape hand gesture made by the forefinger and the middle finger, only to control on/off of the display screen 1110.

The controlling of on/off of the display screen 111 may mean that the display screen 111 is converted from an off-state into an on-state or from an on-state into an off-state. Also, the controlling may mean that lock/unlock of the display screen 111 is controlled. Accordingly, the controlling of on/off of the display screen 111 may mean that the display screen 111 is converted from a locked-state into an unlocked-state or from an unlocked-state into a locked-state.

Especially, the display screen controlling apparatus uses information on depth (a distance between an object and the mobile terminal 110) as well as a 2D image (an image configured of RGB signals), only to enhance a recognition rate for an object. In this instance, as the object is the user's gesture, the user's gesture is typically three-dimensional (the hand gesture is 3-dimensional by fingers' directions and shapes), the recognition rate for the object can be enhanced more.

In addition, when the object is the user's gesture, the depth information may be used and movement of a background area of an image having an object may be removed easily.

At this time, the display screen controlling apparatus uses a cut-off filter provided in the camera 112 in calculating a distance between an object and the mobile terminal 110 from a first image acquired, using the cut-off filter and a second image distinguished from the first image. The first image may be acquired by an image sensor provided in the camera 112, with one of R, G and B signals cut off by the cut-off filter. In contrast, the second image may be acquired by the image sensor, with on cut-off signal of R, G and B signals drawn via a pin hole of the cut-off filter. That will be described in detail later, referring to FIGS. 2 and 3.

The display screen controlling apparatus operates an auxiliary sensor, while driving the camera 112 to recognize an object, and it can selectively drive the camera 112. Although not shown in the drawing, the display screen controlling apparatus may include a motion sensor (e.g., a gyro-sensor) for sensing motion along x, y and z axes. Once sensing motion of the mobile terminal 110, using the motion sensor, the display screen controlling apparatus drives the camera 1112 and then minimizes the power consumed by the camera 112. For instance, when the motion of the mobile terminal 110 sensed by the motion sensor is equal to motion generated when the user 120 uses the mobile terminal 110 (in other words, the display screen 111 is on), the display screen controlling apparatus may drive the camera 112. At this time, motion change generated when the user 120 uses the mobile terminal 110 may be preset in accordance with the user's normal pattern.

The display screen controlling apparatus may use an illuminance sensor as well as the motion sensor. For instance, an illuminance sensor is provided in the mobile terminal 110 and luminance change near the mobile terminal 110 sensed by the illuminance sensor is transmitted to the display screen controlling apparatus. In this instance, the display screen controlling apparatus may drive the camera 112. Specifically, when sensing change from a bright state near the mobile terminal 110 into a dark state, using the illuminance sensor, the screen display controlling apparatus may drive the camera 112. At this time, the illuminance sensor may be used in operating an IrED (Infrared Emitting Diode) provided in the display screen controlling apparatus. The IrED is provided in the display screen controlling apparatus to enable the camera 112 to acquire an image for an object when it is dark near the mobile terminal 110.

The display screen controlling apparatus may uses a touch sensor provided in the display screen 111, as well as the auxiliary sensors. For instance, the display screen controlling apparatus may drive the camera 112, when receiving the user's touch input sensed by the touch sensor.

The mobile terminal having the display screen controlling apparatus mounted therein may be diverse devices having a camera. For instance, the mobile terminal may be a smart phone, a black box device or a monitoring camera.

Figure 2:
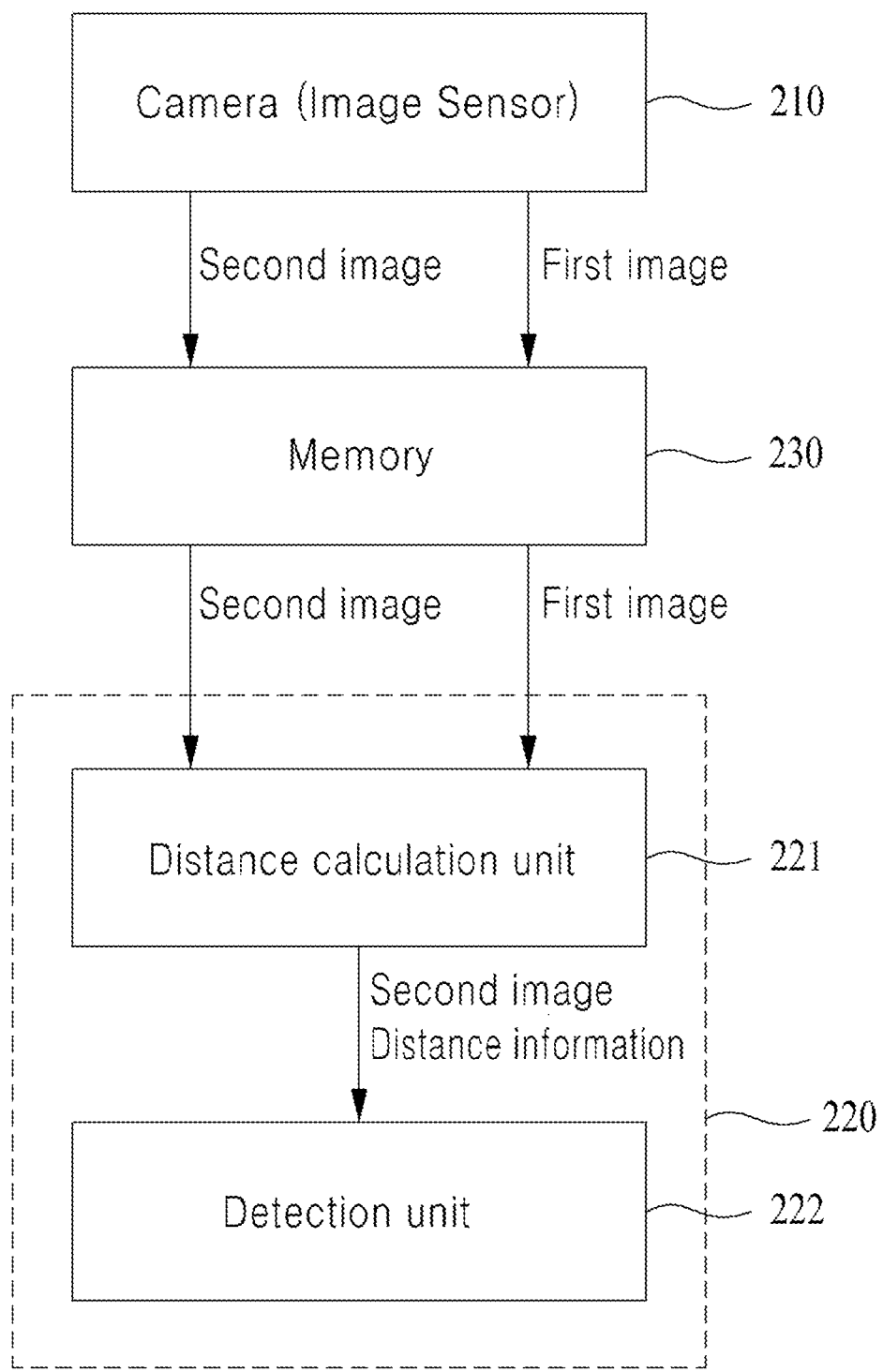
FIG. 2 is a block diagram illustrating a camera and a recognition unit according to exemplary embodiments of the disclosure.

FIG. 2 is a block diagram illustrating a camera and a recognition unit according to exemplary embodiments of the disclosure.

Referring to FIG. 2, a display screen controlling apparatus according to this embodiment of the disclosure may include a camera 210 having an image sensor and a recognition unit 220. An object may be recognized by using a first image and a second image which are acquired by the camera 210.

The camera 210 is a low power camera and it includes a cut-off filter and an image sensor. The camera 210 may be distinguished from a high power camera for a video call. At this time, the camera 210 has to be continuously operated to control on/off of the display screen and it is then important to lower power consumption. The camera 210 may be realized with a low resolution proper to recognize only an object having a user's face or gesture. For instance, a camera with a resolution of 60×80 may be used as the camera 210. In this instance, the camera 210 may replace a gesture sensor and it may perform a function of the gesture sensor, instead of the gesture sensor.

Also, the camera 210 may be loaded in a high power camera for a video call to use some functions of the high power camera, not provided additionally. For instance, a cut-off filter is further provided in the high power camera for the video call, such that the high power camera for the video call can be used as a low power camera for the display screen controlling apparatus.

Such the camera uses the cut-off filter in cutting off one of R, G and B signals. Then the camera 210 acquires a first image configured of the other signals except the cut off one signal and a second image configured of the cut off one signal in response to the inlet of the cut off signal via a pin hole of the cut-off filter. For instance, the cut-off filter may be an R cut-off filter for cutting off an R signal. In this instance, the camera 210 can generate a first image configured of G and B signals except the R signal cut off by the R cut-off filter and then a second image configured of the R signal drawn via a pin hole of the R cut-off filter. At this time, the first image may be relatively blurring, compared with the second image, which will be described in detail later, referring to FIG. 3.

The first and second images acquired from the camera 210 may be temporarily stored in a memory 230 and the recognition unit 220 uses the images in recognizing an object. Specifically, a distance calculation unit 221 provided in the recognition unit 220 calculates a distance between the object and the mobile terminal, using the first and second images. For instance, the distance calculation unit 221 may determine a distance between the object and a focus location of an image sensor provided in the camera 210, based on change in blur of an object provided in an image sensor of the camera 210, and calculates the distance between the image sensor of the camera 210 and the object. At this time, the camera 210 having the image sensor is mounted to the front portion of the mobile terminal and the distance between the image sensor and the object may means a distance between the mobile terminal and the object.

Diverse conventional algorithms can be used as the algorithm for determining the distance between the mobile terminal and the object based on change in blur for the object provided in the first and second images. For instance, the distance calculation unit may acquire blurred patches through a preset process performed for the second image and calculates a difference between the first image and each of the acquired blurred patches. Accordingly, the smallest value of the differences may be determined as a distance between the mobile terminal and the object.

The camera 210 may further include an IR cut-off filter for cutting off an IR (Infrared Ray) signal, rather than the cut-off filter. The signals received in the image sensor provided in the camera 210 may include the R signal, G signal or blue signal, except the cut off R signal received in the image sensor of the camera 210.

The second image is generated before drawn via the pin hole of the cut-off filter it can be relatively darker than the first image. To prevent a quality of the second image from deteriorating, the image sensor may further include an amplification unit for increasing a gain of an amp connected to the image sensor, in case of processing one signal cut off in a cell for processing one cut off signal, and decrease a gain of the amp, in case of processing the other signals except the cut off signal.

Information on the calculated distance between the mobile terminal and the object may be transmitted to a detection unit 222 provided in the recognition unit 220, to be used in recognizing the object. Accordingly, the display screen control apparatus uses the depth information (the distance between the object and the mobile terminal) more than the 2D image such that the recognition rate for the object can be enhanced. For instance, the display screen controlling apparatus may prevent the display screen from being on, in response to display of a photographed image of the object on the camera mounted to the front of the mobile terminal.

Specifically, the detection unit 222 provided in the recognition unit 220 receives at least one of the first and second images from the memory 230 (the drawing shows that the second image is transmitted and the embodiments of the disclosure are not limited thereto and it is preferred that a RGB image generated by combination of the first and second images) and recognize the object, using the information on the calculated distance transmitted from the distance calculation unit 221. For instance, the detection unit 222 detects an object from the second image and generates information on the object. After that, the detection unit 222 compares the generated information on the object with information on a reference object pre-stored based on the calculated distance. More specifically, the detection unit 222 may detect an area of the second image corresponding to the object and generate information on the object (e.g., a size, a location and a direction of an element composing the area corresponding to the object (in case the object is a face, a size, a location and a direction of an eye, a nose or a mouth and in case the object is a hand gesture, a size, a location and a direction of each finger). At this time, the detection unit 222 may detect an object from a RGB image generated by combination of first and second images and generate information on the object, to enhance a recognition rate. Hence, the detection unit 222 may use the preset information on the reference object and compare the pre-stored information on the object with the information on the object calculated based on the distance calculated by the distance calculation unit 221.

If the display screen of the mobile terminal is off in a state where the information on the object calculated based on the calculated distance is equal to the pre-stored information on the reference object, the detection unit 222 may recognize that the user desires to use the mobile terminal.

The result of the recognition for the object performed by the detection unit 222 may be transmitted to the control unit and the control unit may control on/off of the display screen based on the result of the recognition, which will be described in detail later, referring to FIG. 4.

Figure 3:
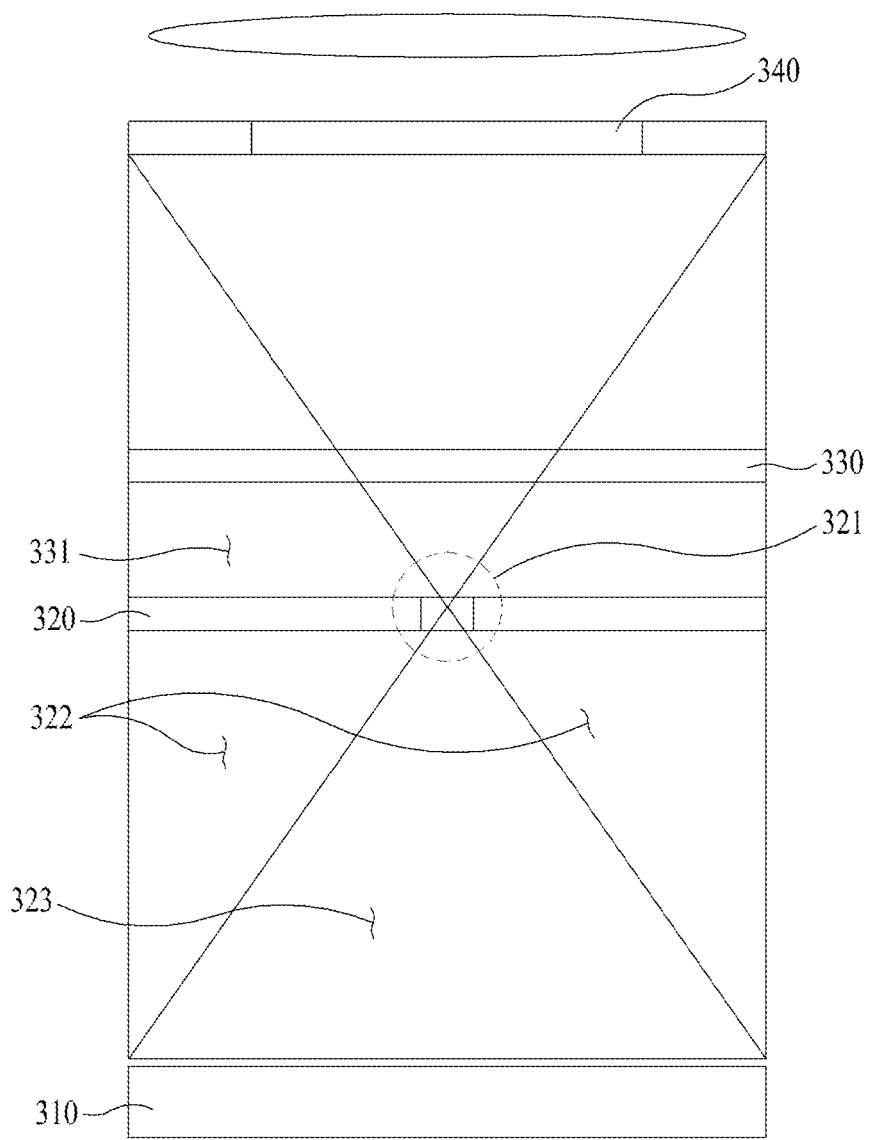
FIG. 3 is a diagram illustrating a camera provided in an apparatus for controlling a display screen according to exemplary embodiments of the disclosure.

FIG. 3 is a diagram illustrating a camera provided in a display screen controlling apparatus according to one embodiment of the disclosure.

Referring to FIG. 3, the camera according to this embodiment may include an image sensor 310, a cut-off filter 320, an IR cut-off filter 330 and a lens diaphragm 340.

The IR cut-off filter 330 may cut off an IR signal out of signals incident via the lens diaphragm 340 (e.g., a RGB signal and an IR signal). Accordingly, only a RGB signal can be incident on a first region 331. If an IrED is provided in the display screen controlling apparatus, the IR cut-off filter may be removed or a dual band filter may be applied so as to receive only an IR signal with a specific wavelength. In this instance, the dual band filter may pass a visible ray and an IR signal with a specific wavelength there through, such that is can minimize the effect on a RGB cell.

The image sensor 310 may receive an R signal, a G signal and a B signal, except the IR signal cut off by the IR cut-off filter 330. Although not shown in the drawing, the image sensor 310 may be a module configured of a CIS (CMOS Image Sensor) and an ISP (Image Signal Processor). The image sensor 310 may include an R cell for processing the R signal, a G cell for processing the G signal and a B cell for processing the B signal. At this time, each of the R, G and B cells can be operated independently and the image sensor 310 processes each of the R, G and B signals independently, only to generate a second image configured of the R signal and a first image configured of the G and B signals.

The cut-off filter 320 may cut off one of the R, G and B signals received in the image sensor 310. For instance, in case the cut-off filter 320 is an R cut-off filter for cutting off an R signal, the G and B signals may reach a G cell and a B cell of the image sensor 310, respectively. As a pin hole 321 of the cut-off filter 320 is functioned as a diaphragm, the R signal is drawn only via the pin hole 321 and reaches the R cell of the image sensor 310. A signal and a B signal are incident on a 2-1 region 322 to reach the G cell and the B cell of the image sensor 310, respectively. In contrast, only an R signal may be incident on a 2-2 region via the pin hole 321. Hereinafter, the pin hole 321 is a pin hole provided in an R cut-off filter for cutting off an R signal and the embodiments of the disclosure are not limited thereto. The pin hole 321 may be a pin hole provided in a G cut-off filter for cutting off a G signal or a pin hole provided in a B cut-off filter for cutting off a B signal.

Accordingly, the camera may receive and process the other signals of the R, G and B signals, except one signal cut off by the cut off filter 320. The camera may acquire a first image configured of the other signals except the one cut-off signal and receive to process the other signals except the one signal cut off by the cut-off filter 320 and it may then acquire a second image configured of the one signal cut off after processed and received via a pin hole 321 of the cut off filter 320.

Figure 4:
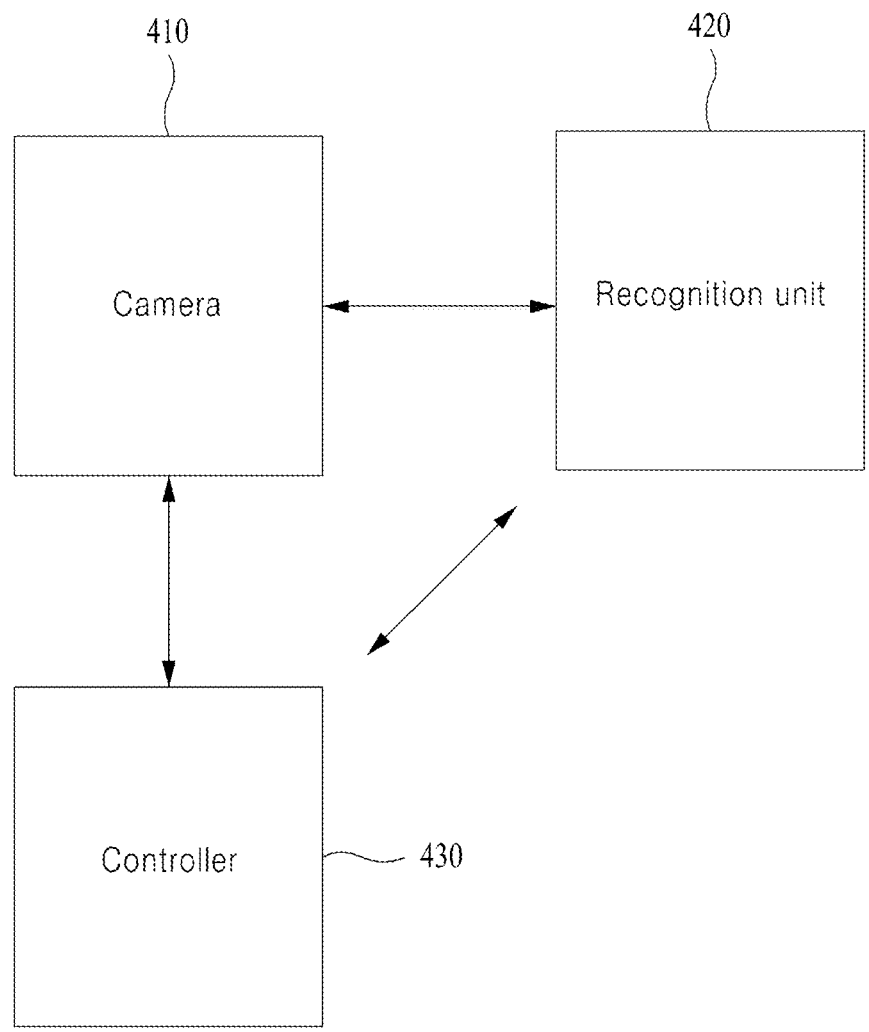
FIG. 4 is a block diagram illustrating an apparatus for controlling a display screen of a mobile terminal according to exemplary embodiments of the disclosure.

FIG. 4 is a block diagram illustrating an apparatus for controlling a display screen of a mobile terminal according to exemplary embodiments of the disclosure.

Referring to FIG. 4, the display screen controlling apparatus according to this embodiment of the disclosure includes a camera 410, a recognition unit 420 and a controller 430.

The camera 410 is attached to a font of a mobile terminal and acquires a first image, using a cut-off filter for cutting off one of R, G and B signals, and a second image distinguished from the first image.

At this time, the camera 410 acquires a first image configured of the other signals except of one cut off signal out of R, G and B signals, using the cut-off filter, and acquires a second image configured of the cut off one signal response to inlet of the cut off one signal drawn via a pine of the cut-off filter.

To reduce the power consumption, the camera 410 may be selectively operated by auxiliary sensors (e.g., a motion sensor for sensing change of motions of a mobile terminal and an illuminance sensor to sense change in illuminance near a mobile terminal, although not shown in the drawing) provided in the display screen controlling apparatus. For instance, when sensing change in motions of a mobile terminal from a motion sensor or change in illuminance near the mobile terminal from an illuminance sensor, the camera 410 can be operated. Alternatively, the camera 410 may be operated when sensing a user's touch input from a touch sensor.

The recognition unit 420 may recognize an object including a user's face and gesture.

Although not shown in the drawing, the recognition unit 420 may include a first distance calculation unit for calculating a distance between an object and the mobile terminal, using the first and second images and a detection unit for detecting an object provided in at least one of the first and second images and generating information on the object, and for comparing the generated information on the object with information on a reference object preset based on the calculated distance to recognize the object.

In this instance, the detection unit may detect an object from a RGB image generated by combination of the first and second images and generate the information on the object.

Alternatively, the detection unit may independently perform a process, in which an object is detected from at least one of the first and second images and information on the object is generated, and a process, in which the generated information on the object is compared with information on a reference object preset based on the calculated distance and the object is recognized based on the result of the comparison. Accordingly, the detection unit may be operated while the mobile terminal controls on/off of the display screen and also while the mobile terminal performs a photographing function. For instance, when the mobile terminal performs a photographing function, the detection unit may perform the process of detecting an object from an image photographed by the camera 410, only to reduce the time taken for the mobile terminal to process the image and to enhance a detectability factor for the object.

The controller controls on/off of the display screen of the mobile terminal based on the result of the recognition performed by the recognition unit 420. Specifically, the controller 430 may convert an on-state into an off-state of the display or an off-state into an on-state of the display screen of the mobile terminal.

At this time, the controller may control the display screen to be on, when the information on the object is equal to the information on the preset reference object based on the calculated distance between the object and the mobile terminal calculated by the distance calculation unit. If the information on the object is not equal to the information on the present reference object based on the calculated distance between the object and the mobile terminal, with the display screen being on, the controller 430 may convert the current state of the display screen into an off-state.

When the information on the object is equal to the information on the preset reference object based on the calculated distance between the object and the mobile terminal calculated by the distance calculation unit, the controller 430 may release lock of the display screen. If the information on the object is not equal to the information on the present reference object based on the calculated distance between the object and the mobile terminal, the controller 430 may convert the current state of the display screen into a locked state.

When the information on the object is equal to the information on the preset reference object based on the calculated distance between the object and the mobile terminal calculated by the distance calculation unit in case a touch sensor provided in the display screen is in a non-active state, the controller 430 may convert a current state of the touch sensor into an active state.

Unless the user desires the function of locking and unlocking the display screen, the photographed image may be compared with face characteristics possessed by an ordinary person, not compared with preset face characteristics possessed by a user, and only the display screen may be converted on and off. Generally, a detectability factor is higher when the face characteristics of the ordinary person are recognized than when face characteristics of the reference user. Accordingly, the embodiment of the display screen controlling apparatus may control on/off of only the display screen, using a function of detecting face characteristics of an ordinary person or using the function combined with another type function of lock/unlock of the screen.

The controller 430 may operate a preset function of the mobile terminal based on the result of the recognition performed by the recognition unit 420. For instance, the controller 430 may implement functions operated by a gesture sensor based on the result of the recognition performed by the recognition unit 420 for an image acquired by the camera 410. More specifically, the controller 430 when the information on the object is equal to the information on the preset reference object based on the calculated distance, the controller 430 may implement functions preset in the mobile terminal (e.g., a function of playing/stopping of a current music file or playing the former or next music file and a function of displaying a current photo file or the former or next photo file).

Figure 5:
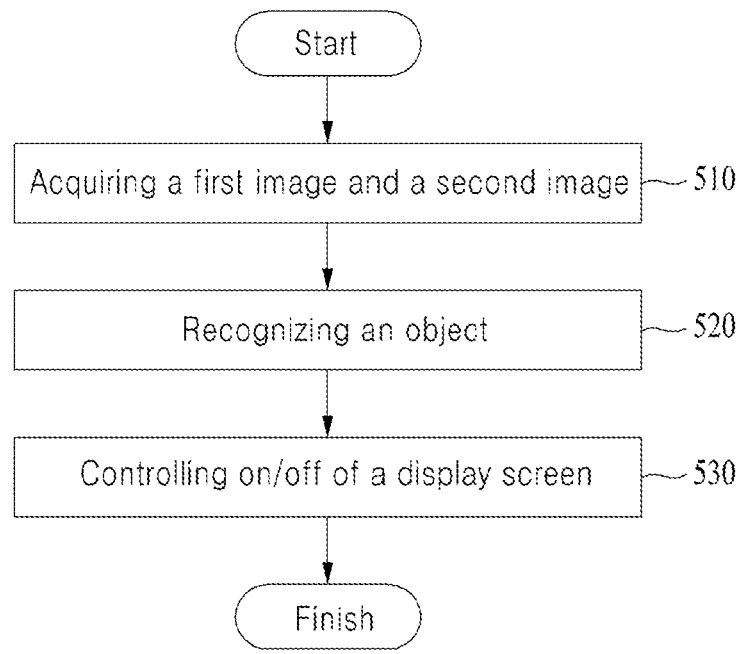
FIG. 5 is a flow chart illustrating a method for controlling a display screen of a mobile terminal according to exemplary embodiments of the disclosure.

FIG. 5 is a flow chart illustrating a method for controlling a display screen of a mobile terminal according to exemplary embodiments of the disclosure.

Referring to FIG. 5, the display screen controlling apparatus according to the embodiment of the disclosure acquires a first image and a second image distinguished from the first image from a camera attached to a front of the mobile terminal, using a cut-off filter for cutting off one of R, G and B signals (510). Specifically, the display screen controlling apparatus acquires the first image configured of the other signals except the one cut off signals out of the R, G and B signals, using the cut-off filter, and the second image configured of the one cut off signal in response to inlet of the cut off signal via a pin hole of the cut-off filter.

Although not shown in the drawing, the display screen controlling apparatus may sense change in motions of the mobile terminal to selectively operate the camera, using a motion sensor. Alternatively, the display screen controlling apparatus may sense change in luminance near the mobile terminal to selectively operate the camera, using an illuminance sensor. The display screen controlling apparatus may sense the user's touch input, using a touch sensor.

Hence, the display screen controlling apparatus recognizes an object including one of the user's face or gesture based on the first image and the second image (520).

Although not shown in the drawing, the display screen controlling apparatus calculates a distance between the object and the mobile terminal, using the first image and the second image, and detects the object from at least one of the first and second images, to generate information on the object. The display screen controlling apparatus compares the information on the object with information on a preset reference object based on the calculated distance, only to recognize the object. The display screen controlling apparatus may detect an object from a RGB image generated by combination of the first and second images and generate the information on the object.

After that, the display screen controlling apparatus controls on/off of the display screen provided in the mobile terminal based on the result of the recognition (530). Specifically, the display screen controlling apparatus may convert an on-state into an off-state or an off-state into an on-state of the display screen based on the result of the recognition.

At this time, when the information on the object is equal to the information on the preset reference object based on the calculated distance between the object and the mobile terminal, the display screen controlling apparatus may control the display screen to be on.

Alternatively, when the information on the object is equal to the information on the preset reference object based on the calculated distance between the object and the mobile terminal, the display screen controlling apparatus may release lock of the display screen.

When the information on the object is equal to the information on the preset reference object based on the calculated distance between the object and the mobile terminal, the display screen controlling apparatus may control a touch sensor provided in the display screen to be active.

A specific first embodiment (in case the object is the user's face) of the operation of the display screen controlling apparatus will be described as follows:

1) when the display screen of the mobile terminal is off, the user moves the mobile terminal in front of the user's face and watch the display screen;

2) When change in motions of the mobile terminal is equal to normal change in motions (change in motions made by the user to use the mobile terminal), or when the user touches the display screen lightly, the camera attached to the front of the mobile terminal is operated (if the mobile terminal has low power consumption, the camera can be operated, without such a preliminary operation);

3) Once an illuminance sensor senses that illuminance near the mobile terminal is dark near the mobile terminal, a motion IrED is operated (when an average illuminance of the image acquired after pre-photographed by the camera is a preset value or lower, the IrED is operated);

4) The camera acquires a first image and a second image, using a cut-off filter for cutting off one of R, G and B signals;

5) The recognition unit recognizes the user' face based on the first image and the second image;

6) When the information on the user's face is equal to preset information on the user' face based on the result of the recognition, a current state of the display screen of the mobile terminal is converted into an on-state (when a human face is recognized even in case the user's face is not equal to the pre-stored user's face, with a security function not being operated in the mobile terminal, a current state of the display screen is converted into an on-state); and 7) When the information on the user's face is not equal to the preset information on the user's face based on the pre-stored user's face, the display screen is kept in an on-state (when the user's face is not recognized as a human face even in case the user's face is not equal to the pre-stored user's face, with a security function not being operated in the mobile terminal, an off-state of the display screen is kept).

In case the object is a gesture, a specific second embodiment of the operation performed by the display screen controlling apparatus will be described as follows:

1) When the display screen of the mobile terminal is in an off-state, the user moves the mobile terminal in front of the face to input a hand gesture for using the mobile terminal;

2) When change in motions of the mobile terminal is equal to preset change in motions (change in motions normally performed by the user), or when the display screen is lightly touched by the user, the camera attached to the front of the mobile terminal (if the mobile terminal has a low power consumption, the camera may be operated even without such preliminary operation).

3) At this time, when it is sensed from the illuminance sensor that illuminance near the mobile terminal is dark, a motion IrED is operated (when an average illuminance of the image acquired after pre-photographed by the camera is a preset value or lower, the IrED is operated);

4) The user inputs a hand gesture toward the camera attached to the front of the mobile terminal;

5) The camera acquires a first image and a second image, using a cut-off filter for cutting off one of R, G and B signals;

6) The recognition unit recognizes the user' hand gesture based on the first image and the second image;

7) When the information on the user's hand gesture is equal to preset information on the user' hand gesture based on the result of the recognition, a current state of the display screen of the mobile terminal is converted into an on-state (when a human hand is recognized even in case the user's hand gesture is not equal to the pre-stored user's hand gesture, with a security function not being operated in the mobile terminal, a current state of the display screen is converted into an on-state); and 8) When the information on the user's hand gesture is not equal to the preset information on the user's hand gesture based on the pre-stored user's hand gesture, the display screen is kept in an on-state (when the user's hand gesture is not recognized as a human hand even in case the user's hand gesture is not equal to the pre-stored user's hand gesture, with a security function not being operated in the mobile terminal, an off-state of the display screen is kept).

In case the apparatus according to the embodiments of the disclosure is used as a gesture sensor, the apparatus is continuously operating without a preliminary operation such as touch and recognize a gesture, to implement a function preset in a mobile terminal. For instance, in case it is operating as the gesture sensor, the display screen controlling apparatus control moving to the next photograph or to the next music based on the result of the recognition. In this instance, the display screen display controlling apparatus may distinguish motion of the background based on the depth information, only to reduce recognition errors.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A method for controlling a display screen of a mobile terminal comprising:
acquiring a first image and a second image distinguished from the first image, using a cut-off filter provided in a camera attached to a front of the mobile terminal to cut off one of a R (Red) signal, a G (Green) signal, or a B (Blue) signal, wherein the camera includes an image sensor, a cut-off filter, and a lens diaphragm;
recognizing an object comprising a user's face or gesture based on the first image and second image; and
controlling on/off of the display screen provided in the mobile terminal based on the result of the recognition, wherein the acquiring comprises:

acquiring the first image from two of the R signal, the G signal, and the B signal by using the cut-off filter to filter out one of the R signal, the G signal, and the B signal, and acquiring the second image from the R signal, the G signal, and the B signal that pass through a pin hole in the cut-off filter, wherein the recognizing of the object comprises:
calculating a distance between the object and the mobile terminal using the first image and the second image,
detecting the object from at least one of the first image or the second image and generating information on the object, and
comparing the information on the object with information on a pre-stored reference object based on the calculated distance and recognizing the object.

2. The method for controlling a display screen of a mobile terminal of claim 1, wherein the controlling of on/off of the display screen provided in the mobile terminal comprises:
controlling the display screen to be on, when the information on the object is equal to the information on the pre-stored reference object based on the calculated distance.

3. The method for controlling a display screen of a mobile terminal of claim 1, wherein the generating of the information on the object comprises,
detecting the object from a RGB image generated by combination of the first image and the second image and generating the information on the object.

4. The method for controlling a display screen of a mobile terminal of claim 1, wherein the acquiring of the first image and the second image comprises:
sensing a change in motion of the mobile terminal to operate the camera, using a motion sensor.

5. The method for controlling a display screen of a mobile terminal of claim 1, wherein the acquiring of the first image and the second image comprises:
sensing a change in illuminance near the mobile terminal to operate the camera, using an illuminance sensor.

6. The method for controlling a display screen of a mobile terminal of claim 1, wherein the acquiring of the first image and the second image comprises:
sensing the user's touch input to operate the camera, using a touch sensor provided in the display screen.

7. The method for controlling a display screen of a mobile terminal of claim 1, wherein the controlling of on/off of the display screen provided in the mobile terminal comprises:
implementing a function preset in the mobile terminal based on the result of the recognition.

8. An apparatus for controlling a display screen of a mobile terminal comprising:
a camera attached to a front of the mobile terminal to acquire a first image and a second image distinguished from the first image, using a cut-off filter for cutting off one out one of a R (Red) signal, a G (Green) signal, or a B (Blue) signal;
a recognition unit for recognizing an object having one of a user's face and gesture based on the first image and the second image; and
a controller for controlling on/off of the display screen provided in the mobile terminal based on the result of the recognition,
wherein the camera acquires the first image from two of the R signal, the G signal, and the B signal by using the cut-off filter to filter out one of the R signal, the G signal, and the B signal,
wherein the camera acquires the second image from the R signal, the G signal, and the B signal that pass through a pin hole in the cut-off filter,
wherein the recognition unit comprises:
a distance calculation unit configured to calculate a distance between the object and the mobile terminal, using the first image and the second image, and
a detection unit configured to detect the object from at least one of the first image or the second image to generate information on the object and comparing the generated information on the object with information on a preset reference object based on the calculated distance of the object to recognize the object.

9. The apparatus for controlling the display screen of the mobile terminal of claim 8, wherein the controller controls the display screen to be on, when the information on the object is equal to the information on the preset reference object.

10. The apparatus for controlling the display screen of the mobile terminal of claim 8, wherein the detection unit detects the object from a RGB image generated by combination of the first image and the second image and generates the information on the object.

11. The apparatus for controlling the display screen of the mobile terminal of claim 8, further comprising:
a motion sensor for sensing change in motion of the mobile terminal to operate the camera.

12. The apparatus for controlling the display screen of the mobile terminal of claim 8, further comprising:
an illuminance sensor for sensing change in illuminance near the mobile terminal to operate the camera.

13. The apparatus for controlling the display screen of the mobile terminal of claim 8, wherein the display screen comprises a touch sensor for sensing the user's touch input to operate the camera.

14. The apparatus for controlling the display screen of the mobile terminal of claim 8, wherein the controller implements a function preset in the mobile terminal based on the result of the recognition performed by the recognition unit.

* * * * *